United States Patent [19]

Nakane et al.

[11] Patent Number: 5,021,545

[45] Date of Patent: Jun. 4, 1991

[54] FLAME-RETARDANT HALOGENATED COPOLYESTER AND ELECTRIC WIRE COATED WITH THE SAME

[75] Inventors: Toshio Nakane; Michiro Naka, both of Fuji; Hiroaki Konuma, Shimizu; Kenji Hijikata, Mishima, all of Japan

[73] Assignee: Polyplastics Co., Ltd., Osaka, Japan

[21] Appl. No.: 595,558

[22] Filed: Oct. 11, 1990

Related U.S. Application Data

[62] Division of Ser. No. 311,855, Feb. 17, 1989.

[30] Foreign Application Priority Data

Feb. 26, 1988 [JP]  Japan .................................. 63-43523

[51] Int. Cl.$^5$ ............................................. C08G 63/02
[52] U.S. Cl. .................................. 528/272; 528/274; 528/296; 528/299; 528/300; 528/302; 528/308; 528/308.6; 525/537; 525/442; 524/878
[58] Field of Search ............... 528/272, 274, 296, 299, 528/300, 302, 308, 308.6; 525/437, 442; 524/878

[56] References Cited

U.S. PATENT DOCUMENTS

| | | | |
|---|---|---|---|
| 3,904,578 | 9/1975 | Kawase et al. | 524/334 |
| 4,055,606 | 10/1977 | Prevorser et al. | 525/438 |
| 4,223,125 | 9/1980 | Bier et al. | 528/305 |
| 4,435,546 | 3/1984 | Bier et al. | 525/418 |
| 4,528,346 | 7/1985 | Sugie et al. | 525/523 |
| 4,803,115 | 2/1989 | Fushiki et al. | 428/285 |

*Primary Examiner*—John Kight, III
*Assistant Examiner*—S. A. Acquah
*Attorney, Agent, or Firm*—Birch, Stewart, Kolasch & Birch

[57] ABSTRACT

The present invention provides a novel flame-retardant halogenated copolyester containing a branched or crosslinked structure to an extent such that it will not impair the solubility of the copolyester in solvent to thereby reduce the lowering in the softness caused by thermal history. Therefore, this copolyester and a composition comprising the same are particularly useful as a coating material for an electric wire to be used in the vicinity of a heat source or in an environment in danger of heat buildup.

8 Claims, No Drawings

FLAME-RETARDANT HALOGENATED COPOLYESTER AND ELECTRIC WIRE COATED WITH THE SAME

This application is a divisional of copending application Ser. No. 07/311,855 filed on Feb. 17, 1989.

BACKGROUND OF THE INVENTION

1. Field of the Invention

The present invention relates to a flame-retardant copolyester which is useful as a general industrial material necessitating flame retardance, particularly as a coating material for an electric wire, and a composition containing the same. Particularly, it relates to a flame-retardant halogenated copolyester which contains a branched or crosslinked structure and which does not lose its softness by thermal history and is excellent in flame retardance, a composition containing the same and an electric wire coated with the same.

2. Description of the Prior Art

Up to this time, rubber, polyvinyl chloride, polyethylene, polypropylene, nylon and the like have been used as a coating material for an electric wire. Particularly, polyvinyl chloride has been often used from the viewpoint of flame retardance and mechanical strengths. As the service environment of such a coating material has become severe, the level of the characteristics required with respect to the material has also enhanced. Namely, it has been required that the material be excellent in heat resistance, electrical characteristics and flame retardance and can exhibit excellent capability for forming a coating thin enough to attain space saving.

Although both a fluororesin and a crosslinked polyethylene satisfy these requirements, both and unsatisfactory in their individual capability for forming a thin coating, and particularly, a fluororesin is further disadvantageously expensive.

Polyethylene terephthalate and polybutylene terephthalate are noticed by virtue of their high capability for forming a thin coating and their having excellent mechanical strengths (softness and wear resistance), heat resistance and electrical characteristics. However, they are insufficient in flame retardance, so that various attempts have been made in order to improve their flame retardance. Among the attempts made, is by introducing a halogen compound as a comonomer into a polyester which is free from the bleeding of a flame retardant. This halogenated copolyester is promising as a coating material for an electric wire.

However, such a polyalkylene terephthalate copolyester is a crystalline resin, so that it exhibits significant lowering in its softness by thermal history such as thermal treatment or service in an heated state to bring about a lowering in the mechanical strengths such as impact resistance. Therefore, the use of the copolyester in the vicinity of a heat source or in an environment in danger of heat buildup must be avoided, thus restricting the application thereof considerably.

An attempt of adding an elastomer to such a copolyester to thereby reduce the crystallinity as much as possible has been made for the purpose of overcoming the above disadvantage.

Although the composition according to this attempt is slightly improved in its qualities, the composition still contains crystalline resin matrix, so that it has disadvantages in that it is intolerable to long-term thermal history and that the lowering in the crystalline resin content of the composition brings about a lowering in the mechanical characteristics such as wear resistance.

SUMMARY OF THE INVENTION

In view of the above problems, the present inventors of the present invention have eagerly studied to obtain a material which does not lose its softness due to thermal history and is flame-retardant and excellent in mechanical and electrical characteristics and have found that a flame-retardant halogenated aromatic copolyester which contains a branched or crosslinked structure to an extent such that it will not impair the solubility of the copolyester in solvent, satisfies the above requirements and is useful particularly as a coating material for an electric wire. The present invention has been accomplished on the basis of this finding.

Namely, the present invention relates to a flame-retardant halogenated copolyester prepared by the condensation polymerization of (a) a component mainly comprising an aromatic dicarboxylic acid or an ester-forming derivative thereof, (b) a component manly comprising an aliphatic glycol or an ester-forming derivative thereof, (c) an ester-forming halogenated compound and (d) a branching compound, which has a halogen content of 0.5 to 30% by weight and contains 0.001 to 0.5 molar % (based on the total amount of the carbonyl groups of the copolyester) of the branching compound (d), a composition containing said copolyester and an electric wire coated with the same.

It has been very difficult to simultaneously satisfy various characteristics required for the use as a coating material for an electric wire, such as flame retardance, wear resistance and softness (flexing properties and high elongation) on the one hand, and a capability of maintaining its initial high elongation and flexing resistance even when in a heated atmosphere for a prolonged period of time without losing its initial softness by thermal history on the other. Accordingly, it is surprising that a copolyester which satisfies the various characteristics required for the use as a coating material for an electric wire, particularly exhibits remarkably enhanced stability in a heated atmosphere for a prolonged period of time with reduced loss in the softness by thermal history can be obtained by introducing a branched or crosslinked structure into a halogenated polyalkylene terephthalate copolymer to an extent such that it will not impair the solubility of the copolyester in solvent.

DETAILED DESCRIPTION OF PREFERRED EMBODIMENTS

The copolyester to be used in the present invention will now be described.

First, the essential components constituting the copolyester according to the present invention will be described. Component (a) mainly comprises an aromatic dicarboxylic acid or an ester-forming derivative thereof. Representative examples of the aromatic dicarboxylic acid or its ester-forming derivative include terephthalic acid and its derivatives. Further, component (a) may additionally contain other dicarboxylic acid(s) such as isophthalic, naphthalenecarboxylic or naphthalenedicarboxylic acid or a derivative thereof; a fatty acid such as adipic, sebacic, trimellitic or succinic acid or an ester-forming derivative thereof or an aromatic hydroxy carboxylic acid such as hydroxybenzoic or hydroxynaphthoic acid or an ester-forming derivative thereof.

Component (b) constituting the copolyester according to the present invention mainly comprises an aliphatic diol or an ester-forming derivative thereof. Representative examples of the aliphatic diol or its ester-forming derivative include ethylene glycol, 1,4-butylene glycol, 1,3-propanediol, 1,4-butenediol, 1,6-hexanediol and 1,8-octanediol. Further, it is possible to use a low-molecular weight diol as described above together with a high-molecular weight glycol such as polyalkylene oxide glycol, examples of which include polyethylene oxide glycol and polybutylene oxide glycol. The simultaneous use of a low-molecular weight diol with a high-molecular weight glycol is very effective in enhancing the elongation of the aromatic polyester coating material for an electric wire according to the present invention and in imparting flexing resistance to the material. Further, component (b) may additionally contain an aromatic alcohol such as bisphenol A, 4,4'-dihydroxybiphenyl or phenyl 1,4-dihydroxyphosphinate; an alkylene oxide adduct of alcohol, such as an adduct of bisphenol A with alkylene oxide such as ethylene oxide (2 mol) or propylene oxide (2 mol) or an ester-forming derivative thereof.

The copolyester according to the present invention is an aromatic copolyester containing halogen atoms bonded to its molecule prepared by using ester-forming halogenated compound (c) as a comonomer. Examples of compound (c) to be used for this purpose are as follows, while the halogen is particularly preferably bromine:

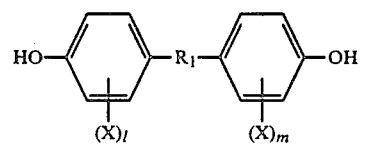

(1)

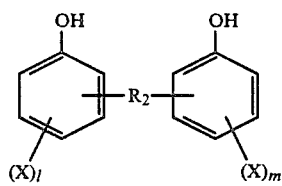

(2)

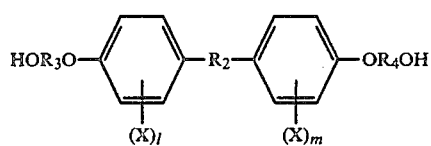

(3)

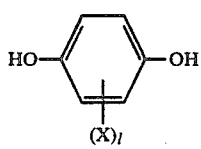

(4)

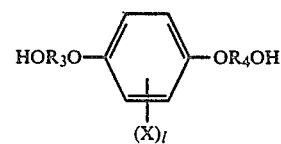

(5)

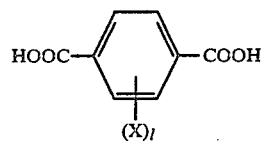

(6)

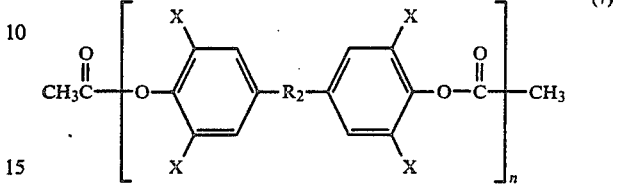

(7)

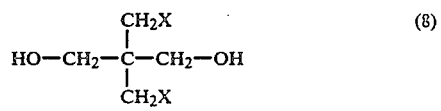

(8)

wherein

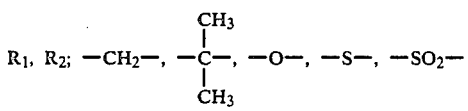

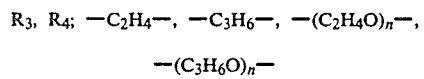

X: halogen
l, m: 1 to 4
n: an integer of 1 or above.

Preferred examples of compound (c) to be incorporated as a comonomer include those represented by general formulae (1) to (7). When the halogen is bromine, the compound of general formula (1) includes tetrabromobisphenol A and tetrabromobisphenol sulfone; the compound of general formula (2) includes tetrabromobisphenol F; the compound of general formula (3) includes an adduct of tetrabromobisphenol A with ethylene oxide (2 mol), an adduct of tetrabromobisphenol A with propylene oxide (2 mol), an adduct of tetrabromobisphenol sulfone with ethylene oxide (2 mol) and an adduct of tetrabromobisphenol sulfone with propylene oxide (2 mol); the compound of general formula (4) includes tetrabromohydroquinone; the compound of general formula (5) includes an adduct of tetrabromohydroquinone with ethylene oxide (2 mol); the compound of general formula (6) includes tetrabromoterephthalic acid and the compound of general formula (7) includes polycarbonate of tetrabromobisphenol A.

The halogenated compound to be incorporated as a comonomer preferably has a molecular weight of at least 390. If the molecular weight of the compound is too low, no contribution will be made to the improvement in the oxygen index which is an indication of flame retardance. Further, the halogenated compound still preferably contains at least one aromatic ring in its molecule.

The halogenated compound is added in such an amount so as to give a halogen content of 0.5 to 80% by weight to the resulting copolymer, preferably 2 to 20% by weight. If the halogen content is less than 0.5% by weight, sufficient flame retardance will not be attained, while if it exceeds 30% by weight, the mechanical properties will be unfavorably lowered.

The ratio of the monomers to be used in the preparation of the copolyester according to the present invention will be described. When the ester-forming functional group of halogenated compound (c) is an alcohol group, the total amount of components (b) and (c) per 100 mol of the component (a) may be 90 to 200 mol, preferably 95 to 150 mol. When the ester-forming functional group thereof is a carboxyl group, the amount of component (b) per 100 mol of components (a) and (c) may be 90 to 200 mol, preferably 95 to 150 mol.

When a coating material having a higher oxygen index is desired depending upon the service condition, one having an objective high oxygen index can be obtained by suitably selecting the content of component (c) to thereby control the halogen content of the copolymer.

The branching compound to be used as component (d) according to the present invention has at least three functional groups selected from among carboxyl and hydroxyl groups and ester-forming groups derived therefrom. These functional groups may be the same or different from each other.

Examples of compound (d) having such functional groups include trimesic, trimellitic, pyromellitic, mellitic, butanetricarboxylic and butenetricarboxylic acids and alkyl esters thereof; acid anhydrides such as trimellitic anhydride; glycerol, trimethylolpropane, trimethylolhexane, pentaerythritol, dipentaerythritol, 1,3,5-trimethylolbenzene, 1,3,5-triethylolbenzene, 2,2,6,6-tetramethylolcyclohexanol and esters thereof with lower carboxylic acids and hydroxy carboxylic acid such as 5-hydroxyisophthalic acid and derivatives thereof.

Among these, alkyl trimesate, alkyl trimellitate, glycerol, trimethylolpropane and pentaerythritol are preferred.

According to the present invention, a specified amount of branching compound (d) is used to thereby introduce a branched structure of a proper degree into a halogenated polyester.

If a branched structure of too high a degree is introduced into a halogenated polyester, the resulting copolymer will form a three-dimensional network, so that it will be brittle to cause gelation finally. However, a copolymer obtained by introducing a branched structure into a halogenated polyester by the addition of a specified amount of component (d) according to the present invention does not lose the softness resulting from the polyester and can maintain the strength and softness resulting therefrom, even if the chain of the copolymer somewhat causes cleavage by long-term thermal history.

Branching compound (d) is copolymerized in such an amount as to give a content of 0.001 to 0.5 molar %, preferably 0.01 to 0.5 molar % based on the total content of the carbonyl groups of the copolymer. If the content of component (d) is less than 0.001 molar %, no preventive effect on the lowering of softness due to thermal history will be attained, while if the content is more than 0.5 molar %, the resulting copolymer will exhibit too high a viscosity or will be converted into a three-dimensional insoluble and infusible one, so that it will be poor in processability causing problems in the application thereof to an electric wire.

The copolymer to be used in the present invention can be prepared by any conventional method such as melt polymerization, interfacial polymerization or solid phase polymerization, and may have an intrinsic viscosity of 0.5 to 3.0.

When the copolymer of the present invention is used in the coating of an electric wire or other applications, a minor amount of other thermoplastic resin(s) may be auxiliarily used depending upon the object. The thermoplastic resin to be used may be any one which is stable at high temperature. Examples of the resin include aromatic polyesters comprising an aromatic dicarboxylic acid and a diol or a hydroxy carboxylic acid, such as polyethylene terephthalate, polybutylene terephthalate and polyoxyalkylene glycol phthalate; polyester elastomers, polyamide, polycarbonate, ABS, polyphenylene oxide, polyalkyl acrylate, polyacetal, polysulfone, polyester sulfone, polyether imide, polyether ketone and fluororesins. These thermoplastic resins may be used as a mixture of two or more. Particularly, the mixture thereof with polyalkylene glycol terephthalate, for example, polybutylene terephthalate is suitable for the object of the present invention.

Although the copolymer of the present invention exhibits excellent characteristics without the use of additives, various conventional additives may be added to the copolymer for the purpose of enhancing the performance thereof. Examples of such additives include stabilizers such as antioxidant and ultraviolet absorber, antistatic, flame-retardant auxiliary, coloring agent such as dye and pigment, lubricant for imparting fluidity or mold release characteristics, lubricating agent, crystallization accelerator (nucleating agent) and inorganic substances. Particularly, the addition of an antioxidant preferably serves to enhance the heat stability.

Examples of the stabilizers include hindered phenols, amines and phosphorus compounds.

Particular examples of the hindered phenol include 2,2-methylenebis(4-methyl-6-t-butylphenol), hexamethylene glycol bis(3,5-di-t-butyl-4-hydroxyhydrocinnamate), tetrakis[methylene(3,5-di-t-butyl-4-hydroxyhydrocinnamate)]methane, triethylene glycol bis-3-(3-t-butyl-4-hydroxy-5-methylphenyl)-propionate, 1,3,5-trimethyl-2,4,6-tris(3,5-di-t-butyl-4-hydroxybenzyl)benzene, n-octadecyl 3-(4'-hydroxy-3',5'-di-t-butylphenyl)-propionate, 4,4'-methylenebis(2,6-di-t-butylphenol), 4,4'-butylidenebis-(6-t-butyl-3-methylphenol), 2,2'-thiodiethyl bis[3(3,5-di-t-butyl-4-hydroxyphenyl)propionate, distearyl 3,5-di-t-butyl-4-hydroxybenzylphosphonate and 2-t-butyl -6-(3-t-butyl-5-methyl-2-hydroxybenzyl)-4-methylphenyl acrylate. These compounds may be used either alone or as a mixture of two or more. Among the compounds, hexamethylene glycol bis(3,5-di-t-butyl-4-hydroxyhydrocinnamate), tetrakis-[methylene(3,5-di-t-butyl-4-hydroxyhydrocinnamate)]-methane and triethylene glycol bis-3-(3-t-butyl-4-hydroxy-5-methylphenyl)propionate are particularly preferred.

Particular examples of the amine include N-phenyl-N'-isopropyl-p-phenylenediamine, N,N'-diphenyl-p-phenylenediamine, 4,4'-bis(4-α,α-dimethylbenzyl)-diphenylamine, condensate of diphenylamine with acetone, N-phenylnaphthylamine and N,N'-di-β-naphthylphenylenediamine.

Particular examples of the phosphorus compound include phosphonites represented by the general formula (9):

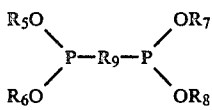

(9)

wherein $R_5$, $R_6$, $R_7$ and $R_8$ may be the same or different from each other and each stand for an alkyl, substituted alkyl, aryl or substituted aryl group having 1 to 25 carbon atoms. Examples thereof include methyl, ethyl, butyl, octyl, decyl, lauryl, tridecyl, stearyl, phenyl and alkyl- and/or alkoxy-substituted phenyl groups; $R_9$ stands for an alkylene or substituted alkylene group having 4 to 33 carbon atoms, and an arylene or substituted arylene group. Examples thereof include butylene, octylene, phenylene, naphthylene, diphenylene groups and groups represented by the general formula:

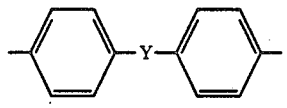

(wherein Y stands for an oxy, sulfonyl, carbonyl, methylene, ethylidene, butylidene, isopropylidene or diazo group). Particularly, tetrakis(2,4-di-t-butylphenyl)-4,4'-diphenylenediphosphonite is preferred.

The amount of the stabilizer to be added is 0.01 to 5% by weight, preferably 0.1 to 3% by weight, based on the total amount of the composition.

The flame-retardant auxiliary includes antimony compounds such as antimony trioxide and antimony halides; compounds containing a metal such as zinc or bismuth; clayey silicates such as magnesium hydroxide and asbestos and halogenated polymers such as brominated polycarbonate and brominated epoxy resins.

The inorganic substance includes conventional inorganic fibers such as glass fiber, ceramic fiber, boron fiber, potassium titanate fiber and asbestos; powdery or granular materials such as potassium carbonate, highly dispersible silicate, alumina, aluminum hydroxide, talc, clay, mica, glass flake, glass powder, glass bead, quartz powder, quartz sand, wollastonite, carbon black, barium sulfate, plaster of paris, silicon carbide, alumina, boron nitride and silicon nitride; lamellar inorganic materials and whiskers.

These inorganic fillers may be used alone or as a mixture of two or more.

An electric wire coated with the copolymer or composition according to the present invention can be prepared by any ordinary method known to the art. Generally, a coating material is applied to a travelling conductor by melt extrusion. The application may be carried out either by extruding a coating material in the same direction as that of the travelling or by using a crosshead having a certain angle against the direction of the travelling.

The use of a screw extruder is preferable, because the flow rate of a coating material can be easily controlled thereby.

The nonuniformity in coating thickness is detected by an ordinary method using X-rays, ultrasonic wave or the like.

The degree of eccentricity resulting from the nonuniformity in coating thickness is shown by concentricity ratio $e_c$:

$$e_c = \frac{e_{min}}{e_{max}} \times 100$$

$e_{min}$: minimum cross section thickness of coating
$e_{max}$: maximum cross section thickness of coating A higher $e_c$ value is more desirable and the $e_c$ is preferably at least 65%, still preferably at least 70%.

The nonuniformity of coating thickness may be controlled by detecting the nonuniformity with a detector, followed either by automatically or manually adjusting the clearance between a die of a screw extruder and a conductor at the center of the die, or by adjusting the flow rate of a coating material together with pressure and temperature.

The use of a non-eccentric head is effective in reducing the nonuniformity of coating thickness.

According to the present invention, after an electric wire coated with the coating material of the present invention has been shaped, the wire may be passed through a heating zone for the purpose of further enhancing the mechanical strengths of the coating. The temperature of the heating zone may be lower than the melting point of the coating material and higher than the glass transition temperature thereof.

The present invention provides a flame-retardant halogenated aromatic copolyester and a composition containing the same. The copolymer and composition according to the present invention are excellent in flame retardance, heat stability, electrical characteristics, mechanical properties and the like to be generally useful as a flame-retardant industrial material and is superior to these according to the prior art in this regard. Particularly, when they are used as a coating material for an electric wire, they are remarkably improved in the resistance to lowering in the physical properties due to thermal history to bring about the following advantages:

(1) they exhibit high flame retardance and are improved in the resistance to lowering in the physical properties due to thermal history, so that they are useful for an electric wire to be used in the vicinity of a heat source, an engine of a transport or a heat buildup part of an electrical appliance, (2) the thickness of a coating can be reduced without adversely affecting the mechanical and electrical characteristics. Further, they are excellent in flexing properties, so that an effective utilization of a limited space can be dramatically enhanced. Therefore, they are particularly useful for an electric wire to be used in a space rocket characterized by highly accumulated data and limited spatial capacity, airplanes, transports such as an automobile, electrical appliances, computers or other information processing equipment, and (3) they contain a halogen compound incorporated thereinto, so that they are free from the bleeding of a flame retardant at high temperature or elution thereof with a solvent, though such problems are caused in the coating material according to the prior art. Therefore, an electrical wire coated with the copolymer or composition of the present invention exhibits an excellent appearance and does not cause blocking thereof with each other in its production to lower the coating cost.

The coating material according to the present invention has characteristics as described above, so that it is useful not only for an electric wire to be used in transport, electric, electronic and information equipment and other machines, but also for various equipment and devices requiring the above characteristics.

The present invention will now be described in more detail by referring to the following Examples which by no mean restrict the invention.

EXAMPLE 1

100 parts by weight of dimethyl terephthalate (DMT), 70 parts by weight of 1,4-butanediol (BD), 16.3 parts by weight of an adduct of tetrabromobisphenol A with ethylene oxide (2 mol) and 0.026 part by weight of trimethyl trimesate (TMT) were fed into a reactor fitted with a stirrer, a nitrogen gas inlet tube and an outlet tube, followed by the addition of a predetermined amount of a catalyst. The reactants were stirred at 180° C. in a stream of nitrogen for 30 minutes, while generated methanol was distilled off. Then, the introduction of nitrogen was stopped. The temperature of the reaction mixture was gradually increased, while lowering the pressure of the reactor. Finally, the mixture was kept in a vacuum of 0.1 mmHg at 250° C. for 2.5 hours to complete the polymerization.

The obtained polymer had an intrinsic viscosity of 1.0 and a bromine content of 6.5% by weight. The polymer was molded into a test piece with an injection molding machine according to a conventional method and examined for physical properties.

The physical properties were each determined as follows:

Namely, the tensile strength and elongation (%) were determined according to ASTM D 638. The dielectric breakdown was determined according to the ASTM D 149 short-time test, while the oxygen index as an indication of flame retardance was determined according to JIS K 7201. The appearance was determined by observing it after the storage at 120° C. for 500 hours to evaluate a case wherein an abnormal phenomenon such as bleeding or blister was observed as "X" and a case wherein no abnormal phenomenon was observed as "O". Further, a test piece for the tensile test was stored in a thermostatic chamber of 120° C. for 500 hours to determine its strength and elongation according to the same manner as the one described above. Furthermore, the resin according to the present invention was applied to a stranded copper conductor having a diameter of 1 mm in a thickness of 0.2 mm with an extruder fitted with a cross head and the resulting coated electric wire was examined for wear resistance according to JIS C 3406. The wear resistance was evaluated by using a stranded copper conductor having a diameter of 1 mm which had been coated with polyvinyl chloride (PVC) in a thickness of 0.5 or 1 mm as a standard (the former is referred to as standard wire A, while the latter as standard wire B) to show a case wherein the minimum wear resistance is lower than the wear resistance of the standard wire A by "X", a case wherein it is between the wear resistance of the standard wire A and that of the standard wire B by "Δ" and a case wherein it is higher than the wear resistance of the standard wire B by "O".

The results are shown in Table 1.

EXAMPLE 2

The polymerization was carried out in the same manner as the one described in Example 1 except that the amount of trimethyl trimesate used as the component (d) was 0.26 part by weight. Thus, a polymer having an intrinsic viscosity of 1.2 and a bromine content of 6.5% by weight was obtained.

This polymer was examined and evaluated in a similar manner to the one described in Example 1. The results are shown in Table 1.

EXAMPLE 3

100 parts by weight of DMT, 70 parts by weight of BD, 16.3 parts by weight of an adduct of tetrabromobisphenol A with ethylene oxide (2 mol) and 0.017 part by weight of 1,3,5-trimethylolbenzene (TMB) were polymerized in the same manner as the one described in Example 1 to obtain a polymer having an intrinsic viscosity of 1.3 and a bromine content of 6.5% by weight.

This polymer was examined and evaluated in a similar manner to the one described in Example 1. The results are shown in Table 1.

EXAMPLE 4

The polymerization was carried out in the same manner as the one described in Example 1 except that the amount of TMB used was 0.17 part by weight. Thus, a polymer having an intrinsic viscosity of 1.0 and a bromine content of 6.5% by weight was obtained.

This polymer was examined and evaluated in a similar manner to the one described in Example 1. The results are shown in Table 1.

COMPARATIVE EXAMPLE 1

The polymerization was carried out in the same manner as the one described in Example 1 except that no trimethyl trimesate was used. Thus, a polymer having an intrinsic viscosity of 0.9 and a bromine content of 6.5% by weight was obtained.

This polymer was examined and evaluated in a similar manner to the one described in Example 1.

The results are shown in Table 1.

COMPARATIVE EXAMPLE 2

The polymerization was carried out in the same manner as the one described in Example 1 except that the amount of trimethyl trimesate used was 2.6 parts by weight. When the reactants were stirred in a vacuum of 0.1 mmHg at 250° C. for 1.5 hours, the load of the stirrer rapidly increased to complete the polymerization.

The obtained polymer partially contained a three-dimensional polymer insoluble in a solvent, so that it was not subjected to the subsequent examination and evaluation.

COMPARATIVE EXAMPLE 3

Polybutylene terephthalate (PBT) having an intrinsic viscosity of 1.1 was mixed with 5% by weight of decabromodiphenyl ether (flame retardant) in a powdery state. The obtained mixture was pelletized with an ordinary extruder.

The obtained pellet was examined and evaluated in a similar manner to the one described in Example 1.

The results are shown in Table 1.

COMPARATIVE EXAMPLE 4

Polyvinyl chloride (PVC) not containing any flame retardant was examined and evaluated in a similar manner to the one described in Example 1. The test piece made of PVC was too distorted by the thermal treatment at 120° C. to determine the physical properties thereof.

TABLE 1

|  |  | Examples | | | | Comparative Examples | | | |
|---|---|---|---|---|---|---|---|---|---|
|  |  | 1 | 2 | 3 | 4 | 1 | 2 | 3 | 4 |
| (a) DMT | (pts. wt.) | 100 | 100 | 100 | 100 | 100 | 100 | PBT | PVC |
| (b) BD | (pts. wt.) | 70 | 70 | 70 | 70 | 70 | 70 | (95) | (100) |
| (c) Tetrabromobisphenol A-EO (2 mol) adduct | (pts. wt.) | 16.3 | 16.3 | 16.3 | 16.3 | 16.3 | 16.3 | — | — |
| (d) TMT | (pts. wt.) | 0.026 [0.01]°¹ | 0.26 [0.1]°¹ | — | — | — | 2.6 [1.0]°¹ | PBT (95) | PVC (100) |
| (d) TMB | (pts. wt.) | — | — | 0.017 [0.01]°¹ | 0.17 [0.1]°¹ | — | — |  |  |
| Flame retardant | (pts. wt.) | — | — | — | — | — | — | 5 | — |
| Tensile strength (kg/cm$^2$) |  | 588 | 595 | 582 | 589 | 543 | — | 568 | 220 |
| Tensile elongation (%) |  | 300< | 300< | 300< | 300< | 300< | — | 300< | 250 |
| Dielectric breakdown |  | 17 | 17 | 17 | 17 | 17 | — | 16 | 29 |
| Oxygen index |  | 27 | 27 | 27 | 27 | 27 | — | 28 | 27 |
| After the thermal treatment for 500 hours |  |  |  |  |  |  |  |  |  |
| tensile strength (kg/cm$^2$) |  | 594 | 607 | 587 | 593 | 559 | — | 582 | — |
| elongation (%) |  | 246 | 237 | 216 | 222 | 153 | — | 174 | — |
| appearance |  | O | O | O | O | O | — | X | — |
| Minimum wear resistance |  | O | O | O | O | O | — | Δ | X |

*¹The figures given in parentheses each refer to molar % based on the whole carbonyl groups contained in a polymer

What is claimed is:

1. A copolyester resin composition prepared by adding 0.1 to 3% by weight, based on the total amount of the composition, of a stabilizer to a flame-retardant halogenated copolyester prepared by the condensation polymerization of
   (a) a component mainly comprising an aromatic dicarboxylic acid or an ester-forming derivative thereof,
   (b) A component mainly comprising an aliphatic glycol or an ester-forming derivative thereof,
   (c) an ester-forming halogenated compound and
   (d) a branching compound,
   which has a halogen content of 0.5 to 30% by weight and contains 0.001 to 0.5 molar %, based on the total amount of the carbonyl groups of the copolyester, of said branching compound (d).

2. The copolyester resin composition according to claim 1, wherein said halogen is bromine.

3. The copolyester resin composition according to claim 1, wherein said aliphatic glycol of component (b) is at least one member selected from the group consisting of a C$_{2-8}$ low-molecular weight glycol and a polyalkylene oxide glycol having a molecular weight of from 200 to 4000.

4. The copolyester resin composition according to claim 3, wherein said aliphatic glycol of component (b) is a C$_{2-8}$ low-molecular weight glycol.

5. The copolyester resin composition according to claim 4, wherein said C$_{2-8}$ low-molecular weight glycol is a member selected from the group consisting of ethylene glycol, 1,4-butylene glycol and 1,4-butene glycol.

6. The copolyester resin composition according to claim 1, wherein said ester-forming halogenated compound (c) contains at least four halogen atoms in its molecule.

7. The copolyester resin composition according to claim 1, wherein said branching compound (d) contains, in the molecule thereof, at least three functional groups, said groups are each a member selected from the group consisting of a carboxyl group, a hydroxyl group and an ester-forming group derived therefrom.

8. The copolyester resin composition according to claim 1, wherein the stabilizer is a hindered phenol, an amine or a phosphorus compound.

* * * * *